United States Patent
Savage, II et al.

(10) Patent No.: US 10,298,164 B2
(45) Date of Patent: May 21, 2019

(54) LINEAR ACTUATOR FORCE MATCHING USING BACK EMF

(71) Applicant: Raytheon Company, Waltham, MA (US)

(72) Inventors: Lawrence E. Savage, II, Murphy, TX (US); Patrick J. Sigler, McKinney, TX (US); James Robarge, Allen, TX (US); Gary R. Herrington, Rowlett, TX (US); Mark Gohlke, Van Alstyne, TX (US); Steven Palomino, McKinney, TX (US)

(73) Assignee: Raytheon Company, Waltham, MA (US)

( * ) Notice: Subject to any disclaimer, the term of this patent is extended or adjusted under 35 U.S.C. 154(b) by 582 days.

(21) Appl. No.: 14/280,074

(22) Filed: May 16, 2014

(65) Prior Publication Data

US 2015/0333684 A1 Nov. 19, 2015

(51) Int. Cl.
    *H02P 5/00* (2016.01)
    *H02P 25/06* (2016.01)
    *H02P 6/04* (2016.01)

(52) U.S. Cl.
    CPC ............ *H02P 25/06* (2013.01); *H02P 6/04* (2013.01)

(58) Field of Classification Search
    CPC ........ H02K 41/03; H02P 25/06; B60L 15/005
    USPC ........................................ 318/135
    See application file for complete search history.

(56) References Cited

U.S. PATENT DOCUMENTS

| | | | | |
|---|---|---|---|---|
| 4,797,749 A | * | 1/1989 | Paulsen | G06K 15/1228 348/202 |
| 5,930,531 A | * | 7/1999 | Kitagawa | G03B 39/00 348/E5.046 |
| 6,762,745 B1 | * | 7/2004 | Braun | G06F 3/016 318/568.11 |

(Continued)

FOREIGN PATENT DOCUMENTS

| JP | H07104395 A | 4/1995 |
|---|---|---|
| JP | H07181601 A | 7/1995 |

(Continued)

OTHER PUBLICATIONS

International Search Report and Written Opinion dated Aug. 13, 2015 in connection with International Application PCT/US2015/020756; 9 pages.

(Continued)

*Primary Examiner* — Eduardo Colon Santana
*Assistant Examiner* — Gabriel Agared (57) ABSTRACT

A system includes a plurality of actuators configured to provide forces to an actuatable member to actuate the member between a first position and a second position during an actuation mode. The actuators are also configured to return the member from the second position to the first position during a retrace mode. The system also includes a controller configured to control the actuators. The controller is configured to identify a back electromotive force (BEMF) of each of the actuators during the retrace mode. The controller is also configured to responsively provide control signals to drive the actuators such that the forces provided by the actuators to the member during the actuation mode are substantially equal.

27 Claims, 6 Drawing Sheets

(56) References Cited

U.S. PATENT DOCUMENTS

| | | | |
|---|---|---|---|
| 2003/0234629 A1* | 12/2003 | Trifilo | H02P 6/182 318/459 |
| 2006/0187572 A1* | 8/2006 | Tan | G11B 21/12 360/78.07 |
| 2007/0029956 A1 | 2/2007 | Hofer | |
| 2008/0218823 A1* | 9/2008 | Mizoguchi | H02K 33/16 359/198.1 |
| 2009/0015186 A1* | 1/2009 | Boling | G11B 19/2054 318/507 |
| 2010/0125167 A1* | 5/2010 | Sugimoto | A61B 1/0008 600/109 |
| 2012/0229264 A1* | 9/2012 | Company Bosch | G06F 3/016 340/407.1 |
| 2013/0016413 A1* | 1/2013 | Saeedi | G02B 27/01 359/205.1 |
| 2013/0154539 A1* | 6/2013 | Grossmann | F02D 11/10 318/638 |

FOREIGN PATENT DOCUMENTS

| | | |
|---|---|---|
| JP | 2004336922 A | 11/2004 |
| WO | WO 2013/126719 A2 | 8/2013 |

OTHER PUBLICATIONS

Foreign Communication from Related Counterpart Application; Japanese Patent Application No. 2017-512635; Japanese Office Action dated Jan. 16, 2018; 8 pages.

Office Action dated Oct. 12, 2018 in connection with European Patent Application No. 15 714 709.1, 3 pages.

* cited by examiner

| | | | | | | | |
|---|---|---|---|---|---|---|---|
| CONVERT (oz-in)/A to (N-m)/A | | | | | | | |
| | | | | | | | |
| | | 1 | oz-in/A | | 16 | oz/A | data sh. |
| Kt | | 0.0625 | lb-in/A | | 1 | lb/A | |
| | | 0.02835 | kg-in/A | | 0.453592 | kg/a | |
| | | 0.00072 | kg-m/A | | 0.453592 | | |
| | | 0.007062 | n-m/A | Kt | 4.448218 | N/A | |
| | ▼ | | | | | | |
| GET Kv to (V-sec)/rad | | | | | 1.356 | volt/(ft/sec) | data sh. |
| Kv | | 1 | revolution/minute/volt | | 0.737463 | (ft/sec)/volt | |
| | | 6.283185 | radian/(min/volt) | Kv | 0.224779 | m/(sec-volt) | |
| | | 0.10472 | radian/(sec/volt) | | | | |
| | | 9.549297 | (volt-sec)/rad | Ke | 4.448819 | (volt-sec)/m | |
| | ▼ | | | | | | |
| | | | | Check | 1.000135 | | |
| Ke | | 1 | volt/(ft/sec) | | 11.77 | ratio of data sheet items | |
| | | | | | 15.96012 | oz/amps | |
| Kt:oz-in/A → N/A | | | | | | | |
| Kv:ft/(volt-sec) → m/(sec-volt) | | | | | | | |
| Ke:(volt-sec)/ft → (volt-sec)/m | | | | | | | |
| | | | | | | | |
| When Kt is in N/a and Ke is (volt-sec)/m, then Kt = Ke = 1/Kv | | | | | | | |
| | | | | | | | |

LINEAR ACTUATOR FORCE MATCHING USING BACK EMF

TECHNICAL FIELD

The present disclosure is generally directed to linear actuators and more particularly to linear actuators utilized to provide a controlled force to an actuatable member, such that those used in imaging systems including a scanning mirror.

BACKGROUND OF THE DISCLOSURE

Linear actuators are conventionally used to controllably move a member between two or more positions. There are many applications for linear actuators, each application having different system requirements. There are many parameters that may need to be precisely controlled, such as positioning, distance, speed, force, and time just to name a few.

When multiple linear actuators are used in a system, the complexity of the system increases due to various attributes of the actuators. For example, the performance of an actuator often varies with temperature and age, and thus tolerances are established to allow integration of two or more actuators to cooperate and perform a function. In precise applications, feedback control is typically required to maintain performance of an actuator. Feedback is used to remove errors that can negatively affect the linearity of the system. When two or more linear actuators are coupled to a member, unbalanced forces can reduce the linearity of the system and degrade performance. Also, unbalanced forces can couple with dynamic modes of the driven object, compromising the integrity of in an example case, the reflected surface figure of a mirror.

SUMMARY OF THE DISCLOSURE

This disclosure provides a linear actuator force matching technique using back electromotive force (EMF).

In one embodiment, a system includes a plurality of actuators configured to provide forces to an actuatable member to actuate the member between a first position and a second position during an actuation mode. The actuators are also configured to return the member from the second position to the first position during a retrace mode. The system also includes a controller configured to control the actuators. The controller is configured to identify a back electromotive force (BEMF) of each of the actuators during the retrace mode. The controller is also configured to responsively provide control signals to drive the actuators such that the forces provided by the actuators to the member during the actuation mode are substantially equal.

The controller can be configured to determine a parameter of each of the actuators during the retrace mode, such as the BEMF of each of the actuators. The parameter can be determined during a mid-portion of the retrace mode. The controller can also be configured to control drive currents provided to the actuators during the actuation mode and the retrace mode, where the controller is configured to determine the parameter during the retrace mode when no drive currents are provided to the actuators. The controller can further be configured to use the BEMF of a first of the actuators as a reference and adjust the control signals such that the BEMF of the remaining actuators substantially matches the BEMF of the first actuator.

The controller can be configured to control the actuators in order to linearly actuate the member between the first position and the second position. The controller can also be configured to actuate the member in the actuation mode along a single axis. The actuators can be configured to provide the forces to a mirror, and the controller can be configured to retrace the mirror during the retrace mode. The controller can further be configured to determine an imbalance of the forces provided by the actuators to the member and adjust the forces such that the forces are substantially balanced.

In another embodiment, a method includes providing forces to an actuatable member using a plurality of actuators to actuate the member between a first position and a second position during an actuation mode, where the actuators return the member from the second position to the first position during a retrace mode. The method also includes controlling the actuators using a controller. Controlling the actuators includes identifying a BEMF of each of the actuators during the retrace mode and responsively providing control signals driving the actuators such that the forces provided by the actuators to the member during the actuation mode are substantially equal.

In yet another embodiment, an apparatus includes a controller configured to control a plurality of actuators and identify a parameter of each of the actuators during a retrace mode of a member returning from a second position to a first position. The controller is also configured to responsively provide control signals to drive the actuators during an actuation mode between the first position and the second position such that forces provided by the actuators to the member during the actuation mode are substantially equal.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

FIG. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
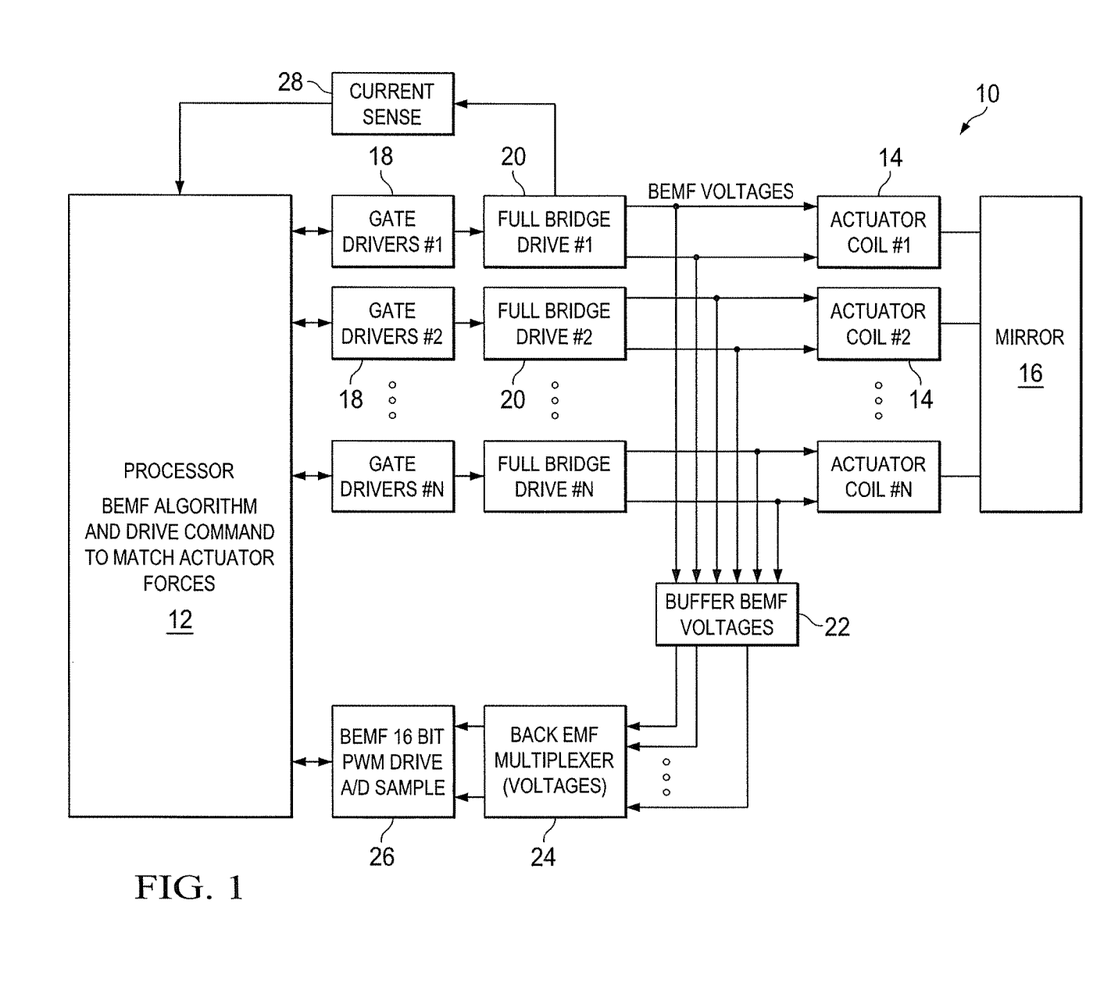
FIG. 1 illustrates an example back electromotive force (BEMF) control system according to this disclosure.

FIG. 1 illustrates an example back electromotive force (BEMF) control system 10 according to this disclosure. In this particular example, the control system 10 is shown as being implemented within a one-axis, four-actuator push-pull implementation of a scanner mirror architecture. However, this disclosure is applicable to other systems having any number of axes, multiple actuators of any number, and any implementation that uses force balance of two or more actuators.

As shown in FIG. 1, the system 10 includes a controller 12, which represents any suitable processing device or combination of processing devices. In this example, the controller 12 is illustrated as a field programmable gate array (FPGA), although other controllers could be utilized, including those configured with analog electronics.

The system 10 also includes multiple actuators 14, each of which is configured to provide a force to a controllable member 16. In this example, there are four actuators 14, although other numbers of actuators may be implemented as desired. The controllable member 16 here is illustrated as a scanner mirror, although other members may be controlled as desired, such as a large optic, such as a membrane, structure or orifice plug. Each actuator 14 is configured to be controllably driven by a respective gate driver 18 that is individually controlled by the controller 12. Controller 12 is configured to provide a PWM control signal to the respective gate drivers 18. Each gate driver 18 provides a level shift of the PWM signal to a respective full bridge drive 20. Each full bridge driver 20 receives the respective level shifted PWM signal, and provides a drive current to the respective actuator 14. The actuator 14 provides a force to the member 16 that is proportional to the drive current.

During operation, each actuator 14 generates a BEMF voltage, referred to as $V_{bemf}$. The voltages $V_{bemf}$ are buffered by a $V_{bemf}$ voltage buffer 22. The voltage buffer 22 couples each of the buffered voltages $V_{bemf}$ to an analog multiplexer 24. The multiplexer 24 selectively provides the voltages $V_{bemf}$ to a BEMF electronic conversion module 26, which converts the voltages $V_{bemf}$ into a suitable form. For example, the conversion module 26 could represent a 16-bit analog-to-digital (A/D) device, although other interfaces could also be used. The multiplexer 24 is controlled by the controller 12 to selectively provide the BEMF voltages $V_{bemf}$ to the conversion module 26. The conversion module 26 can provide digitized or other voltage values to the controller 12 for processing. The voltages $V_{bemf}$ are indicative of and proportional to the forces exerted by respective actuators 14 on the controllable member 16.

Current sensors 28 are coupled to each full bridge drive 20 and output to the controller 12 feedback signals indicative of the actuator currents provided by the respective full bridge drives 20. Each current sensor 28 feeds a current drive feedback signal to a feedback control loop (shown in FIG. 4) within the controller 12, such as by using a multiplexer to select the actuator current to be sampled by the controller 12. The controller 12 may adjust the PWM drive signal provided to the gate drivers 18, based on the current drive feedback signal, to create the desired drive currents for the actuators 14 in order to control a desired position of the controllable member 16. For example, the position of the controllable member 16 could be defined based on a position input (not shown). Moreover, the controller 12 can use the $V_{bemf}$ voltage values from the conversion module 26 to adjust the currents provided to the actuators 14, which can help to reduce or prevent unmatched actuator forces that could distort the controllable member 16.

Unmatched actuator forces can cause various problems in different applications. For example, linear backscan can be critical for reducing distortion in captured imagery within a scanner application. Unmatched actuator forces coupled with dynamic modes of the controllable member 16 can negatively affect the linearity of the backscan pattern. Unbalanced forces can also warp or torque the controllable member 16, which can lead to image distortion errors.

By sensing at least one parameter of the actuators 14 (such as actuator BEMF voltages $V_{bemf}$), the controller 12 senses any differences between the actuator forces and responsively and dynamically adjusts individual actuator commands to help equalize drive forces provided by the actuators 14 on the controllable member 16. In some embodiments, the actuator BEMF constant $K_b$ and the force sensitivity constant $K_f$ are proportional to each other. Ideally, the BEMF voltages $V_{bemf}$ are sampled when there are minimum or no drive currents as determined by the current sensors 28, which can maximize the BEMF voltages. In some embodiments, this occurs during the high-velocity retrace portion of the mirror's movement (such as that shown in window 30 at point 32 in FIG. 2). Retrace occurs when a mirror returns to a starting position after a scan. At this point during the mirror's movement, the voltage across each actuator 14 is dominated by the BEMF voltage $V_{bemf}$, and the drive current is zero. This BEMF voltage $V_{bemf}$ is sampled near the end of the PWM period so that the only voltage sensed is due to BEMF (since no drive voltage is coupled into the measurement).

The controller 12 uses the data from the conversion module 26 to identify the differences of the BEMF voltages $V_{bemf}$ for the actuators 14. Using the conversion factor from $K_b$ and $K_f$, the controller 12 determines the force variations and the currents to balance those actuator forces. In some embodiments, the force provided by one actuator 14 serves as a reference force, and the forces provided by the other actuators 14 are adjusted so that they substantially match the reference force. This can be done by establishing the $V_{bemf}$ of the first actuator 14 as a reference voltage, and the drive currents of the gate drivers 18 are adjusted by the controller 12 so that they substantially match the reference $V_{bemf}$. This $V_{bemf}$ sampling and current adjustment process occurs on each scan cycle and continually balances the forces on the controllable member 16. This process corrects for individual force differences between the actuators 14, as well as for longer-term changes due to temperature or other factors.

Figure 3:
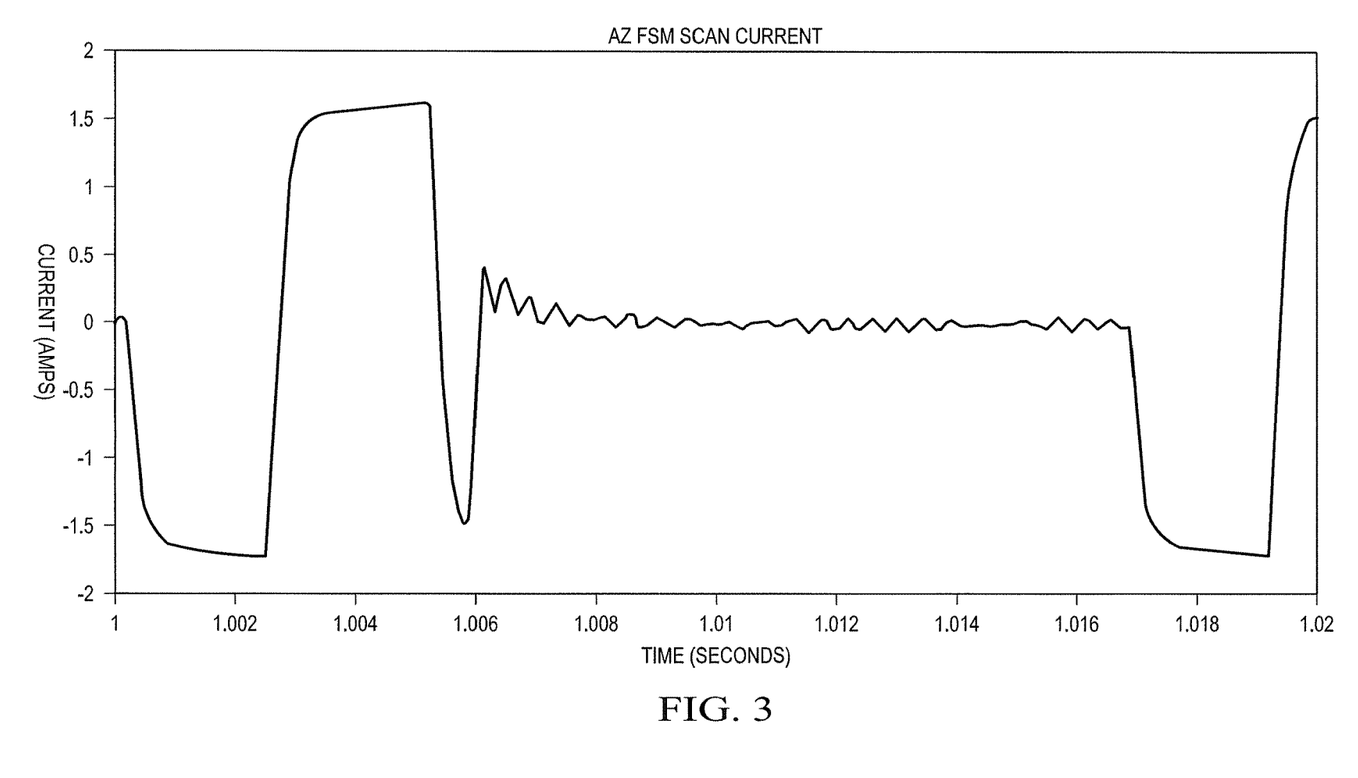
FIG. 3 illustrates an example current drive profile provided by a full bridge drive to an actuator according to this disclosure.

FIG. 3 illustrates an example current drive profile provided by a full bridge drive 20 to an actuator 14 according to this disclosure. The current drive profile is sensed by the controller 12 to determine when the drive current is zero during the retrace mode. The voltage $V_{bemf}$ is measured at zero current crossing during retrace mode for each actuator. During backscan, the drive has a low steady state current based on the closed loop response of the system and commands from the controller 12.

Figure 4:
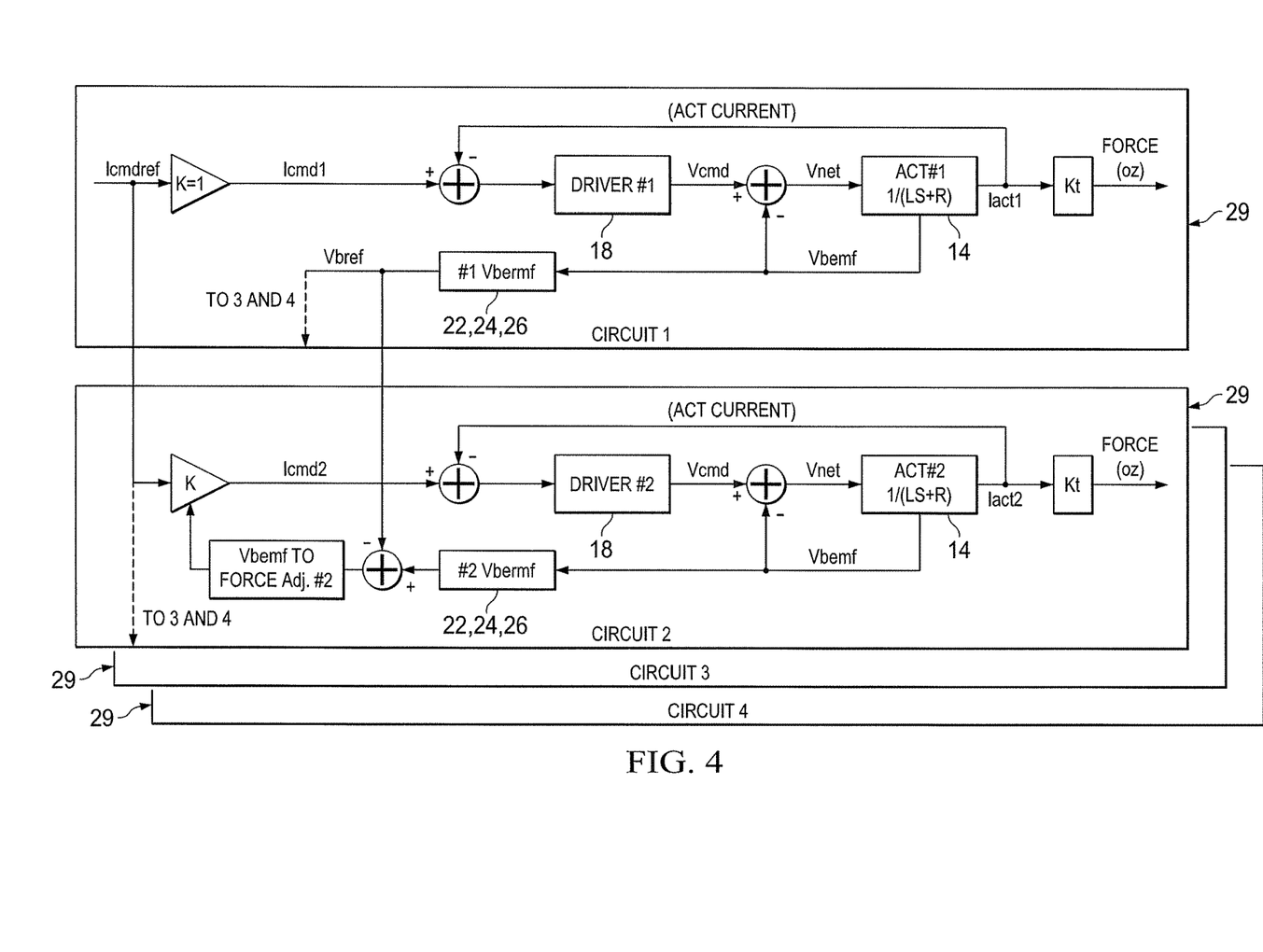
FIG. 4 illustrates example feedback control loops within a controller according to this disclosure.

FIG. 4 illustrates a block diagram of each example feedback control loop 29 associated with each actuator 14 according to this disclosure. In FIG. 4, each control loop 29 includes a respective PWM signal generated by the controller 12, a gate driver 18, a full bridge drive 20, an actuator 14, and the combination of the voltage buffer 22, multiplexer 24, and conversion module 26. The reference voltage $V_{bemf}$ generated by the first actuator 14 is passed by the first control loop 29 to the control loops 29 of the other actuators 14 and is used as a reference. The loop control functions are handled via the controller 12. Each of the actuator 14 loop control functions are measured during retrace independently by the controller 12. The control loops 29 for the other actuators 14 responsively modify their drive gain values in the controller 12 such that the voltage $V_{bemf}$ of the respective actuator 14 matches the reference $V_{bemf}$ ideally so that the drive forces provided by the actuators 14 on the mirror 16 are equal.

As previously described, the actual drive current generated by each full bridge drive 20 is sensed by the respective current sensor 28 and is digitally compared to the PWM drive signal such that the controller 12 can adjust the PWM drive signal, if necessary, to create the desired actuator drive current. The current-to-force conversion of the actuator 14 is represented as Kt in FIG. 4. As shown in the control loops 29 for the second, third and fourth actuators, the $V_{bemf}$ voltage created by each of these actuators 14 is compared to the $V_{bemf}$ voltage created by the first control loop 29. The controller 12, in turn, adjusts the respective PWM signal for each of these control loops 29 such that the $V_{bemf}$ voltage of each of the second, third and fourth actuators matches the $V_{bemf}$ voltage of the first control loop 29.

Figure 5:
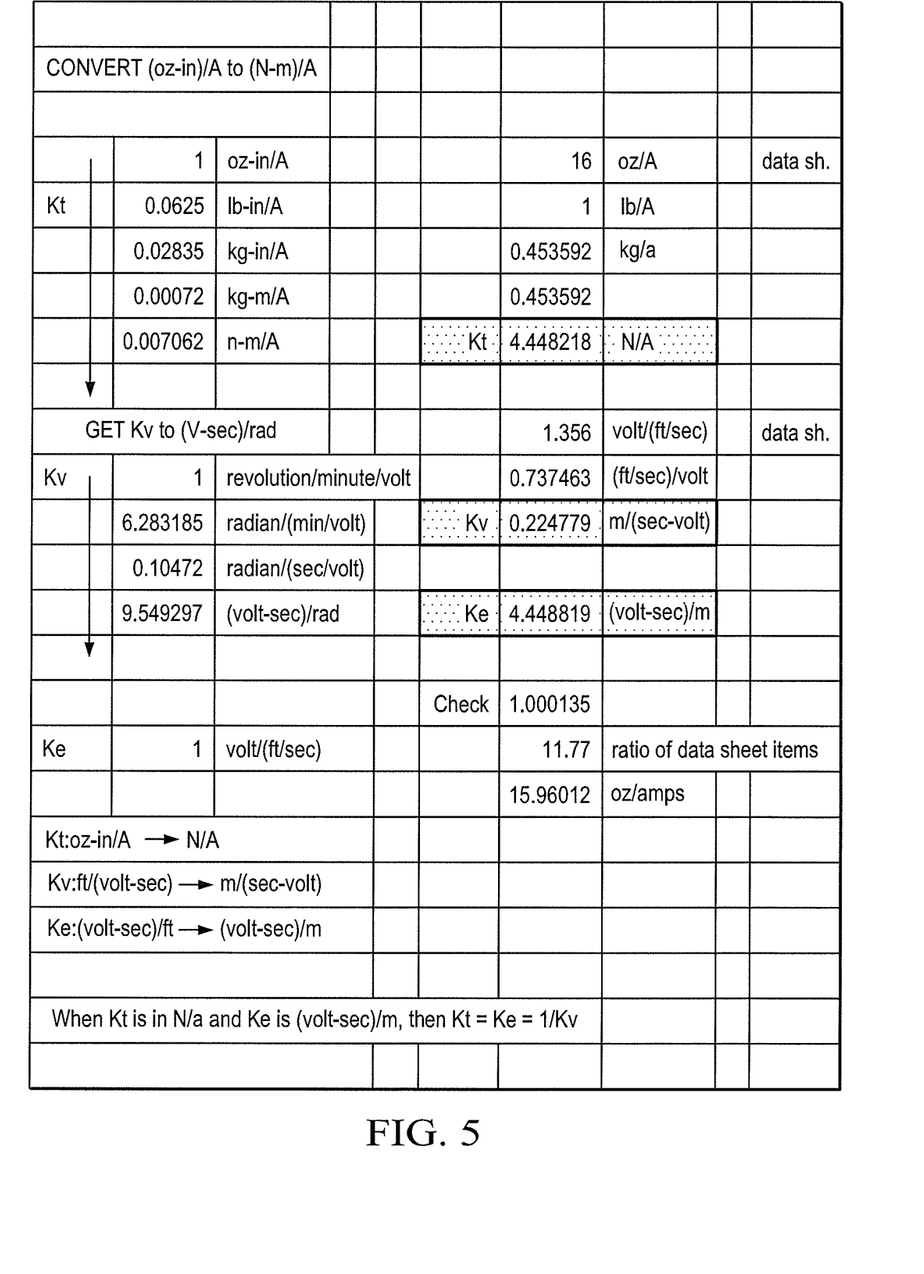
FIG. 5 illustrates example sample parameters for an actuator according to this disclosure.

FIG. 5 illustrates an example of sample parameters for an actuator 14 according to this disclosure. FIG. 5 illustrates the unit conversions for a sample of one actuator 14. The conversions document the units of torque and speed in reference to revolution/minute/volt that represents the $V_{bemf}$ constant and corresponding force/amperes. These conversions are used as samples to understand the $V_{bemf}$ constant used on actuators 14.

Figure 6:
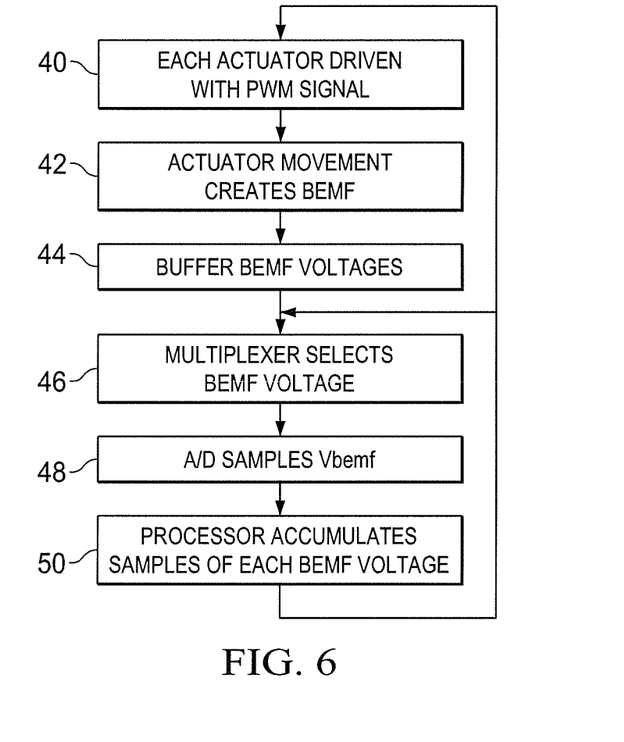
FIG. 6 illustrates an example method for linear actuator force matching according to this disclosure.

FIG. 6 illustrates an example method for linear actuator force matching according to this disclosure. At step 40, the controller 12 provides pulse width modulation (PWM) drive signals to the gate drivers 18. The gate drivers 18 level shift the PWM drive signals provided to the respective full bridge drives 20. The full bridge drives 20 created drive currents based on the level shifted PWM drive signals. In other embodiments, the drive signals could be linear. At step 42, the drive currents create movement in the respective actuators 14. The actuator movements responsively create BEMF voltages $V_{bemf}$.

At step 44, the BEMF voltage buffer 22 buffers the BEMF voltages $V_{bemf}$, and the buffered voltages are provided to the multiplexer 24. At step 46, the controller 12 controls the multiplexer 24 to select the BEMF voltage $V_{bemf}$ from the first actuator 14. At step 48, the conversion module 26 samples the selected BEMF voltage $V_{bemf}$ when the drive current to the first actuator 14 is zero and provides the digital value(s) to the controller 12. At step 50, controller 12 uses the $V_{bemf}$ value ascertained from the first actuator 14 as a reference $V_{bemf}$ (as shown in the control loops 29 of FIG. 4 and previously described), and the controller 12 accumulates samples for the BEMF voltage $V_{bemf}$ that are used in a baseline $V_{bemf}$.

The method returns to step 46, and the controller 12 instructs the multiplexer 24 to select the BEMF voltage $V_{bemf}$ for the second actuator 14. As before, at step 48 the conversion module 26 samples the voltage $V_{bemf}$ when the drive current to the second actuator 14 is zero and provides the digital values to the controller 12. The control loop 29 for the second actuator modifies its drive gain value such that the resulting $V_{bemf}$ from the second actuator 14 substantially matches the reference $V_{bemf}$ of the first actuator 14.

The method again returns to step 46 and step 48 to process the $V_{bemf}$ from the third actuator 14 such that the control loop 29 for the third actuator 14 substantially matches the reference $V_{bemf}$. The method again returns to step 46 and 48 such that the control loop 29 for the fourth actuator 14 substantially matches the $V_{bemf}$ from the fourth actuator 14 to the reference $V_{bemf}$. If there are more actuators, this process iterates until the $V_{bemf}$ from all the actuators 14 are substantially equal.

Figure 2:
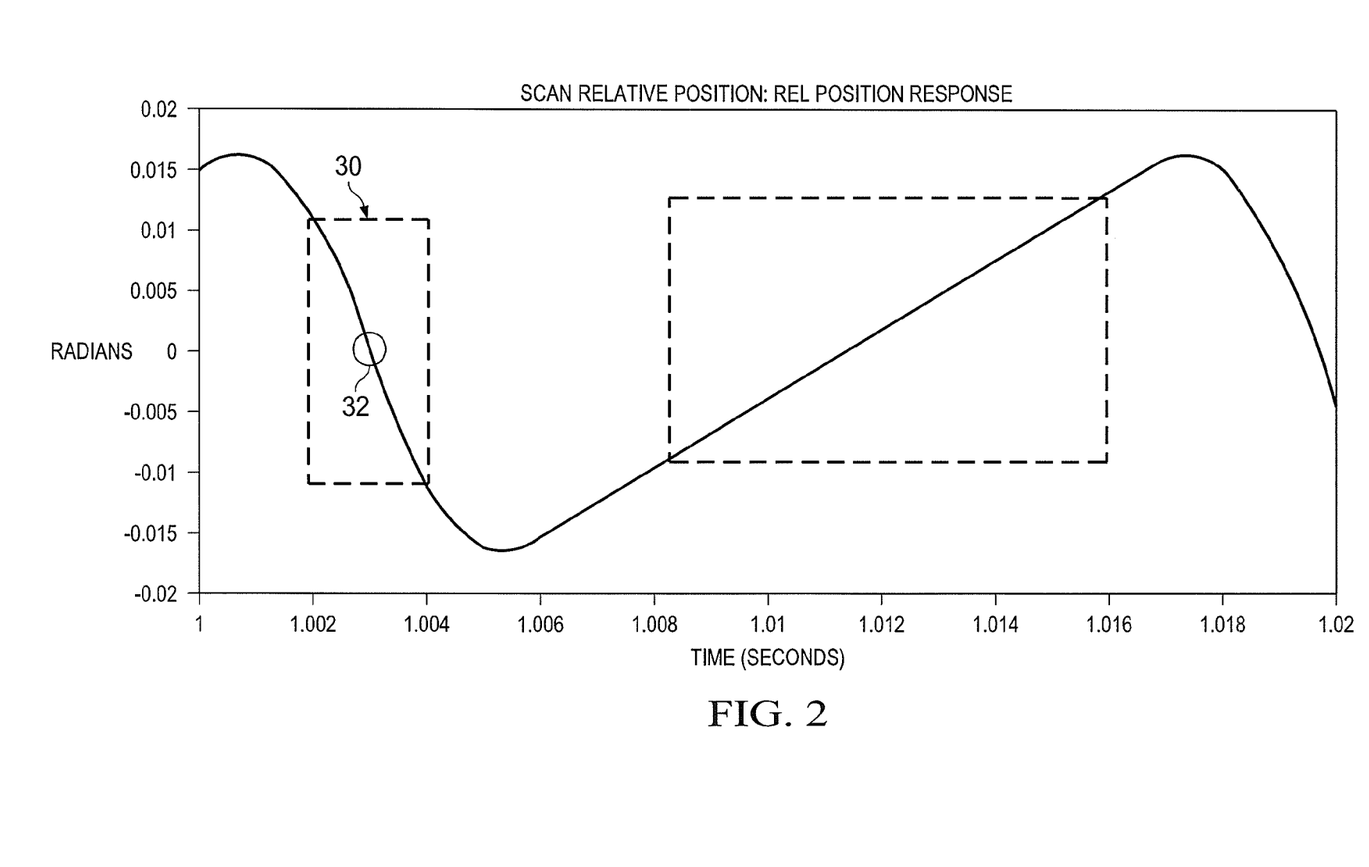
FIG. 2 illustrates an example retrace waveform for an actuator according to this disclosure.

As described above, the $V_{bemf}$ for each actuator 14 is sampled at the point 32 in the window 30 as shown in FIG. 2. This is when the $V_{bemf}$ value is the largest and the drive current is substantially zero.

Variations to the method are within the scope of this disclosure. For instance, the controller 12 may compare the $V_{bemf}$ of any actuator 14 to the $V_{bemf}$ of the first actuator 14 in any particular order. The drive current for the first actuator 14 can also be varied as desired to create a different baseline actuator force. Moreover, the $V_{bemf}$ value can be sampled at other portions of the retrace mode, such as when current is provided to the actuators or during a backscan.

In particular configurations, it may be desirable to have a triad of VCAs together to maintain a linear displacement of a large optic, such as a membrane, structure or orifice plug, such that all points on the object move in an exact straight line, with no angular motion.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A system comprising:
   a plurality of actuators configured to provide forces to an actuatable member to actuate the member from a first position to a second position during an actuation mode, the actuators also configured to return the member from the second position to the first position during a retrace mode; and
   a controller configured to control the actuators, the controller configured to identify a parameter of each of the actuators during the retrace mode and to provide control signals to drive the actuators based on the parameter of each of the actuators such that the forces provided by the actuators to the member during the actuation mode are substantially equal;
   wherein the parameter comprises a back electromotive force (BEMF) of each of the actuators; and
   wherein the controller is further configured to:
   use the BEMF of a first of the actuators as a reference; and
   adjust the control signals such that the BEMF of each remaining actuator substantially matches the BEMF of the first actuator.

2. The system as specified in claim 1, wherein the controller is configured to determine the parameter during a mid-portion of the retrace mode.

3. The system as specified in claim 1, wherein:
   the controller is configured to control drive currents provided to the actuators during the actuation mode and the retrace mode; and
   the controller is configured to determine the parameter during the retrace mode when no drive currents are provided to the actuators.

4. The system as specified in claim 1, wherein the controller is configured to control the actuators in order to linearly actuate the member between the first position and the second position.

5. The system as specified in claim 4, wherein the controller is configured to control the actuators in order to actuate the member in the actuation mode along a single axis.

6. The system as specified in claim 4, wherein:
the member comprises a mirror; and
the controller is configured to retrace the mirror during the retrace mode.

7. The system as specified in claim 1, wherein the controller is configured to:
determine an imbalance of the forces provided by the actuators to the member; and
adjust the forces such that the forces are substantially balanced.

8. A method comprising:
providing forces to an actuatable member using a plurality of actuators to actuate the member from a first position to a second position during an actuation mode and returning the member from the second position to the first position during a retrace mode; and
controlling the actuators using a controller, wherein controlling the actuators comprises identifying a parameter of each of the actuators during the retrace mode and providing control signals driving the actuators based on the parameter of each of the actuators such that the forces provided by the actuators to the member during the actuation mode are substantially equal;
wherein the parameter comprises a back electromotive force (BEMF) of each of the actuators;
wherein the BEMF of a first of the actuators is used as a reference; and
wherein the control signals are adjusted such that the BEMF of each remaining actuator substantially matches the BEMF of the first actuator.

9. The method as specified in claim 8, wherein the parameter is determined during a mid-portion of the retrace mode.

10. The method as specified in claim 8, further comprising:
providing drive currents to the actuators during the actuation mode and the retrace mode;
wherein the parameter is determined during the retrace mode when no drive currents are provided to the actuators.

11. The method as specified in claim 8, wherein the member is linearly actuated between the first position and the second position.

12. The method as specified in claim 11, wherein the member is actuated in the actuation mode along a single axis.

13. The method as specified in claim 11, wherein:
the member comprises a mirror; and
the mirror is retraced during the retrace mode.

14. The method as specified in claim 8, further comprising:
determining an imbalance of the forces provided by the actuators to the member;
wherein providing the control signals adjusts the forces such that the forces are substantially balanced.

15. An apparatus comprising:
a controller configured to:
control a plurality of actuators that provide forces to an actuatable member to actuate the member from a first position to a second position during an actuation mode;
identify a parameter of each of the actuators during a retrace mode of the member returning from the second position to the first position; and
provide control signals to drive the actuators based on the parameter of each of the actuators during the actuation mode such that the forces provided by the actuators to the member during the actuation mode are substantially equal;
wherein the parameter comprises a back electromotive force (BEMF) of each of the actuators; and
wherein the controller is further configured to:
use the BEMF of a first of the actuators as a reference; and
adjust the control signals such that the BEMF of each remaining actuator substantially matches the BEMF of the first actuator.

16. The apparatus as specified in claim 15, wherein the controller is configured to determine the parameter during a mid-portion of the retrace mode.

17. The apparatus as specified in claim 15, wherein the controller is configured to:
control drive currents provided to the actuators during the actuation mode and the retrace mode; and
determine the parameter during the retrace mode when no drive currents are provided to the actuators.

18. The apparatus as specified in claim 15, wherein the controller is configured to control the actuators in order to linearly actuate the member between the first position and the second position.

19. The apparatus as specified in claim 18, wherein the controller is configured to control the actuators in order to actuate the member in the actuation mode along a single axis.

20. The apparatus as specified in claim 18, wherein:
the member comprises a mirror; and
the controller is configured to retrace the mirror during the retrace mode.

21. The apparatus as specified in claim 15, wherein the controller is configured to:
determine an imbalance of the forces provided by the actuators to the member; and
adjust the forces such that the forces are substantially balanced.

22. The system as specified in claim 1, wherein each actuator is associated with a feedback control loop comprising a gate driver, a full bridge driver, the actuator, a voltage buffer, and a multiplexer.

23. The system as specified in claim 4, wherein:
the member comprises an orifice plug; and
the controller is configured to retrace the orifice plug during the retrace mode.

24. The method as specified in claim 8, wherein each actuator is associated with a feedback control loop comprising a gate driver, a full bridge driver, the actuator, a voltage buffer, and a multiplexer.

25. The method as specified in claim 11, wherein:
the member comprises an orifice plug; and
the orifice plug is retraced during the retrace mode.

26. The apparatus as specified in claim 15, wherein each actuator is associated with a feedback control loop comprising a gate driver, a full bridge driver, the actuator, a voltage buffer, and a multiplexer.

27. The apparatus as specified in claim 18, wherein:
the member comprises an orifice plug; and
the controller is configured to retrace the orifice plug during the retrace mode.

* * * * *